(12) United States Patent
Farkas et al.

(10) Patent No.: US 7,236,896 B2
(45) Date of Patent: Jun. 26, 2007

(54) LOAD MANAGEMENT IN A POWER SYSTEM

(75) Inventors: Keith Istvan Farkas, San Carlos, CA (US); Cullen Edwin Bash, San Francisco, CA (US); Parthasarathy Ranganathan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 71 days.

(21) Appl. No.: 10/673,134

(22) Filed: Sep. 30, 2003

(65) Prior Publication Data
US 2005/0071092 A1    Mar. 31, 2005

(51) Int. Cl.
G01R 21/00 (2006.01)

(52) U.S. Cl. .................................................. 702/60

(58) Field of Classification Search .......... 702/60; 307/39, 43
See application file for complete search history.

(56) References Cited

U.S. PATENT DOCUMENTS

| | | | | |
|---|---|---|---|---|
| 5,001,649 A | * | 3/1991 | Lo et al. ..................... | 702/124 |
| 5,414,640 A | * | 5/1995 | Seem ......................... | 700/291 |
| 5,436,510 A | * | 7/1995 | Gilbert ....................... | 307/38 |
| 6,018,203 A | * | 1/2000 | David et al. ................ | 307/52 |
| 6,252,311 B1 | * | 6/2001 | West .......................... | 307/29 |
| 6,795,928 B2 | * | 9/2004 | Bradley et al. ............. | 713/320 |
| 2001/0056330 A1 | * | 12/2001 | Wills ........................... | 702/60 |
| 2003/0023885 A1 | * | 1/2003 | Potter et al. ................. | 713/300 |
| 2003/0055969 A1 | * | 3/2003 | Begun et al. ................ | 709/226 |
| 2003/0084358 A1 | * | 5/2003 | Bresniker et al. .......... | 713/324 |
| 2004/0061380 A1 | * | 4/2004 | Hann et al. .................. | 307/43 |
| 2004/0075343 A1 | * | 4/2004 | Wareham et al. ............ | 307/39 |
| 2004/0224640 A1 | * | 11/2004 | Baccelli et al. ............. | 455/67.11 |
| 2004/0260489 A1 | * | 12/2004 | Mansingh et al. .......... | 702/60 |

* cited by examiner

Primary Examiner—John Barlow
Assistant Examiner—Aditya S. Bhat
(74) Attorney, Agent, or Firm—Ricahrd P. Lange

(57) ABSTRACT

Load demands in a power system are managed by determining whether load demands on one or more power system components need to be varied. If the load demands need to be varied, new load demands to be placed on the power system components are determined. The load demands on the power system components are controlled such that the load demands are substantially equal to the new load demands.

29 Claims, 9 Drawing Sheets

| ROW # | CIRCUIT | BEFORE FAILURE | | CIRCUIT 1 FAILS | | | | CIRCUIT 2 FAILS | | | |
|---|---|---|---|---|---|---|---|---|---|---|---|
| | | | | CONVENTIONAL | | LOAD BALANCING | | CONVENTIONAL | | LOAD BALANCING | |
| | | CIRCUIT LOADS | LOADS | CIRCUIT LOADS | LOADS | CIRCUIT LOADS | LOADS | CIRCUIT LOADS | LOADS | CIRCUIT LOADS | LOADS |
| 1 | 1 | 1.5 | 150a(1/2) 150b(1/2) 150c(1/2) | 0 | 150a(0) 150b(0) 150c(0) | 0 | 150a(0) 150b(0) 150c(0) | | | | |
| 2 | 2 | 1.5 | 150a(1/2) 150e(1/2) 150f(1/2) | 2 | 150a(1) 150e(1/2) 150f(1/2) | 2 | 150a(1) 150e(1/2) 150f(1/2) | | | | |
| 3 | 3 | 1.5 | 150d(1/2) 150e(1/2) 150f(1/2) | 1.5 | 150d(1/2) 150e(1/2) 150f(1/2) | 2 | 150d(1) 150e(1/2) 150f(1/2) | | | | |
| 4 | 4 | 1.5 | 150b(1/2) 150c(1/2) 150d(1/2) | 2.5 | 150b(1) 150c(1) 150d(1/2) | 2 | 150b(1) 150c(1) 150d(0) | | | | |
| 5 | 1 | | | | | | | 0 | 150a(0) 150b(0) 150c(0) | 0 | 150a(0) 150b(0) 150c(0) |
| 6 | 2 | | | | | | | 0 | 150a(0) 150e(0) 150f(0) | 0 | 150a(0) 150e(0) 150f(0) |
| 7 | 3 | | | | | | | 2.5 | 150d(1/2) 150e(1) 150f(1) | 2 | 150d(0) 150e(1) 150f(1) |
| 8 | 4 | | | | | | | 2.5 | 150b(1) 150c(1) 150d(1/2) | 3 | 150b(1) 150c(1) 150d(1) |

FIG. 2A

| ROW # 251 | UPS 252 | BEFORE FAILURE | | AFTER FAILURE | | | | |
|---|---|---|---|---|---|---|---|---|
| | | | | CONVENTIONAL 255 | | | LOAD BALANCING 257 | |
| | | UPS LOADS 253 | LOADS 254 | UPS LOADS | LOADS 256 | | EQUIVALENT LOAD | LOADS 258 |
| 1 | 130a | 1.5 | PDU 140a (1/2)<br>PDU 140b (1/2)<br>PDU 140c (1/2) | 0 | PDU 140a (0)<br>PDU 140b (0)<br>PDU 140c (0) | | 0 | PDU 140a (0)<br>PDU 140b (0)<br>PDU 140c (0) |
| 2 | 130b | 1.5 | PDU 140a (1/2)<br>PDU 140b (1/2)<br>PDU 140d (1/2) | 2.5 | PDU 140a (1)<br>PDU 140b (1)<br>PDU 140d (1/2) | | 2 | PDU 140a (1)<br>PDU 140b (1)<br>PDU 140d (1) |
| 3 | 130c | 1.5 | PDU 140c (1/2)<br>PDU 140e (1/2)<br>PDU 140f (1/2) | 2 | PDU 140c (1)<br>PDU 140e (1/2)<br>PDU 140f (1/2) | | 2 | PDU 140c (1)<br>PDU 140e (1)<br>PDU 140f (1) |
| 4 | 130d | 1.5 | PDU 140d (1/2)<br>PDU 140e (1/2)<br>PDU 140f (1/2) | 1.5 | PDU 140d (1/2)<br>PDU 140e (1/2)<br>PDU 140f (1/2) | | 2 | PDU 140d (1)<br>PDU 140e (1/2)<br>PDU 140f (1/2) |

FIG. 2B

LOAD MANAGEMENT IN A POWER SYSTEM

TECHNICAL FIELD

This invention relates generally to power systems. More particularly, the invention relates to managing the load on components in a power system.

BACKGROUND

Power systems typically include redundant components to prevent power outages. FIG. 8 illustrates an example of using redundant components in a power system. An uninterruptible power supply (UPS) 810 and a UPS 820 supply power to a power distribution unit (PDU) 830, which may be connected to power supplies and electrical devices, i.e., the load, not shown. The UPS 810 and UPS 820 are redundant components and may equally share the load demand of the PDU 830. That is the PDU 830 may draw a substantially equal amount of current from the UPS 810 and the UPS 820 to meet the load demand on the PDU 830. If the UPS 810 fails, then the UPS 820 is available to meet the load demand of the PDU 830 on its own. However, the UPS 820 must be sufficiently provisioned, i.e., must have sufficient capacity, such that the UPS 820 can meet the load demand of the PDU 830 on its own. Furthermore, the UPS 820 may be sharing the load demand of another PDU 840 with another UPS (not shown), and if that UPS fails then the UPS 820 may have to support two loads on its own. Thus, the UPS 820 must be substantially over provisioned to prevent power outages.

Over provisioning components in a power system and using redundant components are fail-safe techniques, but these techniques dramatically increase operating and implementation costs. Typically, as the capacity of a UPS or other power system component increases, costs also increase. Furthermore, even if redundancy and over provisioning are used, the power system may still be susceptible to the "snow ball effect". For example, if the UPS 810 fails then the UPS 820 must meet the load demand of the PDUs 830 and 840. At peek demand intervals, the combined demand of the PDUs 830 and 840 may exceed the capacity of the UPS 820. For example, the UPS 820 may have been designed to have a capacity to meet a lower peek demand, but the peek demand may have increased over time. If the UPS 820 fails, the resulting increased loading may cause other UPSs in the power system to fail, realizing the snow ball effect.

SUMMARY OF THE EMBODIMENTS

According to an embodiment, a method of managing load in a power system comprises determining whether a load demand on at least one power system component of a plurality of power system components needs to be varied. The method further comprises determining a new load demand to be placed on the power system component in response to determining the load demand on the power system component needs to be varied, wherein the new load demand is based on a load demand of at least one other functioning power system component in the power system.

According to another embodiment, a system for balancing load demands on power system components comprises a first set of power system components in the power system and a load manager controlling load demands on the first set of the power system components based on a load balancing scheme.

According to yet another embodiment, an apparatus for managing load demands in a power system comprises means for determining whether load demands on one or more power system components in the power system need to be varied; means for determining new load demands to be placed on the power system components in response to determining the load demands need to be varied; and means for controlling the load demands on the power system components to be substantially equal to the determined new load demands.

BRIEF DESCRIPTION OF THE DRAWINGS

The present invention is illustrated by way of example and not limitation in the accompanying figures in which like numeral references refer to like elements, and wherein:

FIGS. 2A-B illustrate tables providing examples of load balancing, according to embodiments of the invention;

DETAILED DESCRIPTION OF EMBODIMENTS

According to an embodiment of the invention, a load manager is used to manage load demands on components of a power system. In one embodiment, when a failure of a power system component is detected, the load manager determines optimal load demands for the functioning power system components based on a load balancing scheme. In another embodiment, the load manager determines optimal load demands based on a load balancing scheme when the power system is in a steady state, such as when no power system component failures are detected. Load balancing may be performed to minimize the possibility of overloading a power system component; to minimize the possibility of the snowball effect; and to minimize costs due to over provisioning.

Figure 1:
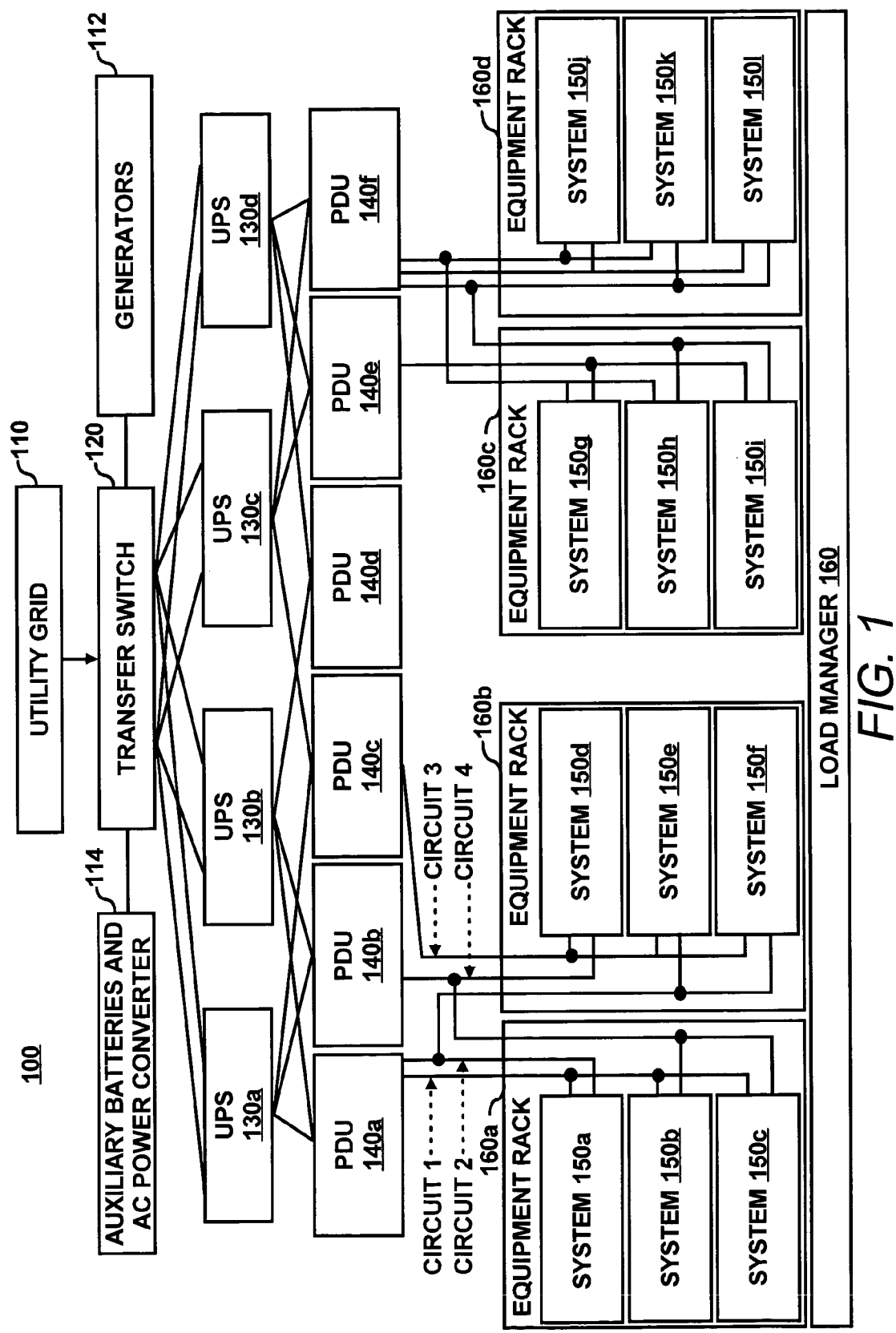
FIG. 1 illustrates a block diagram of a power system, according to an embodiment of the invention.

FIG. 1 illustrates a power system 100, according to an embodiment of the invention. The power system 100, for example, may be used in a data center to supply power to a load, such as the computer systems 150*a-l*. The power system 100 is connected to a power utility grid 110 via a transfer switch 120. The power system 100 may also be connected to alternative energy sources, such as generators 112 and batteries 114. The transfer switch 120 controls which energy source is used to supply power to the power system 100. For example, the power utility grid 110 may be used as primary power source for the power system 100. If the power utility grid 110 fails or sufficient power is not being provided by the power utility grid 110, the transfer switch 120 supplies power to the power system 100 from the alternative energy sources. Alternatively, the alternative energy sources may be used as the primary power source for the power system 100, for example, because power may be supplied from the alternative energy sources at a cheaper rate. Then, power may be drawn from the power utility grid 110 as needed, for example, if the alternative energy sources cannot meet the load demand.

Other components of the power system 100 include UPSs 130*a-d* and PDUs 140*a-f*. The UPSs 130*a-d* are uninterruptible power sources that receive power from an energy source, such as the power utility grid 110, the generators 112 and/or the batteries 114. The UPSs 130*a-d* may provide uninterrupted power for at least a predetermined period of time to the load. For example, the UPSs 130*a-d* may supply uninterrupted power to the loads when the generators 112 are brought on line. Also, the UPSs 130*a-d* include circuits for minimizing undesired features of the power source, such as sags, surges, bad harmonics, etc.

The UPSs 130*a-d* are connected to the PDUs 140*a-f*. The PDUs 140*a-f* are power distribution units that supply power to the power supplies of the computer systems 150*a-l*, which may be housed in racks, such as the racks 160*a-d*. The PDUs 140*a-f* may include AC/AC power supplies, circuit breakers, power failure alarms, and other power conditioning circuits to step down the voltage and condition power supplied to the computer systems 150*a-l*. The computer systems 150*a-l* may include power supplies, not shown, that receive power from the PDUs 140*a-f*. The power supplies may be internal to the computer systems 150*a-l* or housed in the racks 160*a-d*.

Redundancy may be provided at one or more levels of the power system 100. The power system 100 provides N+1 redundancy, where N=1 at one or more levels. However, the power system 100 may also be provided with greater redundancy, e.g., 3+1, 2N+1, etc. The power system 100, also referred to as a grid, includes multiple levels in the grid. Each level may have N+1 redundancy. For 1+1 redundancy at the UPS level, each UPS 130*a-d* is connected to the transfer switch 120 using two separate electrical circuits (not shown) in the transfer switch 120 and two wires. Thus, the failure of any one circuit will not necessarily cause any of the computer systems 150*a-l* to loose power. Similarly, at the PDU level, each of the PDUs 140*a-f* is connected to at least two of the UPSs 130*a-d*. Thus, if for example the UPS 130*a* fails, the UPS 130*b* supplies power to the PDU 140*a*. Redundancy may also be provided at the PDU level. For example, the computer system 150*a* may draw current via circuit 1 and circuit 2, where the circuits 1 and 2 are connected to two different power distribution circuits in the PDU 140*a* so there is no single point of failure. Also, the computer system 150*d* receives current via circuits 3 and 4 connected to PDU 140*c* and PDU 140*b* respectively. Circuits 1-4 may include circuits in the PDUs or connected to the PDUs that distribute power to the loads. For example, the PDU 140*a* may include multiple power output channels, wherein each channel is connected to a load via a circuit breaker. A circuit may include a power output channel and/or other power circuits, such as a circuit breaker, connected to the power output channel. At the computer system level, two power supplies may be used for each computer system to provide redundancy.

The power system 100 includes a load manager 160 for distributing the load demand placed on the components at each level of the power system 100. In a conventional power system, the load demand is shared approximately equally among redundant components to the extent allowed by the discrete amount of power draw from the computer systems (i.e., the load). If one of the redundant power system components fails, the other power system component supports the entire load, which can lead to failure of other power system components and possibly complete power loss due to the snow ball effect. According to an embodiment, the load manager 160 distributes the load demand among substantially all the power system components in a level of the power system according to a load balancing scheme to substantially minimize the possibility of overloading any one of the power system components in the level.

In one embodiment, the load manager 160 may implement load balancing at each level in the power system 100 by controlling the amount of current each component draws from the next higher level. For example, the PDUs 140*a-f* are designed so that the load manager 160 directs each of the PDUs 140*a-f* to draw X% of its current from one of the UPSs 130*a-d* and (1-X)% from another one of the UPSs 130*a-d*, with the value of X controllable by the load manager 160. Similarly, the computer system 150*a-l* may each include at least two power supplies for redundancy, and the load manager 160 directs each power supply to draw X% of the load demand from one the PDUs 140*a-f* or circuits 1-4, and (1-X)% from another one of the PDUs 140*a-f* or circuits 1-4, with the value of X controllable by the load manager 160. For example, if circuit 1 fails and the load demand on circuit 2 increases as a result of the failure, the load manger 160 may direct the computer system 150*d* to reduce its loading of circuit 2 and increase its loading of circuit 3. Thus, in one embodiment, the load manager 160 may direct power system components (e.g., the computer systems 150*a-l*) at one level below the PDUs 140*a-f* to balance the load demand on the PDUs 140*a-f*. This embodiment may be performed at any level in the system 100, and is not limited to balancing the load demand at the PDU level. Load balancing is further illustrated by a table 200 shown in FIG. 2A.

The table 200 shown in FIG. 2A illustrates an example of load balancing implemented by the load manager 160, which can be used to reduce the amount of over provisioning and reduce the likelihood of the snow ball effect. The table 200 is described with respect to the power system 100 shown in FIG. 1. The circuits 1-4 supply power to the loads in the equipment racks 160*a-b*, such as the computer systems 150*a-f*, in an N+1 redundancy implementation, where N=1. As illustrated in row 1 of the table 200 and as illustrated by in FIG. 1, circuit 1 may support ½ of the load demand of the computer system 150*a*, ½ of the load demand of the computer system 150*b*, and ½ of the load demand of the computer system 150*c*. Thus, the load demand on circuit 1 is shown as 1.5 (½+½+½) in row 1, column 203 of the table 200. The circuit loads in the column 203 represent equivalent loads on circuits 1-4, and may be used to compare load balancing according to an embodiment of the invention to conventional load sharing. An equivalent load unit may include the total load on circuits 1-4 divided equally among the circuits 1-4. As shown in row 2 of the table 200, circuit 2 supports ½ of the load demand of each of the computer systems 150*a*, 150*e*, and 150*f*. Circuit 3 supports ½ of the load demand of each of the computer systems 150*d*, 150*e*, and 150*f*; and circuit 4 supports ½ of the load demand of each of the computer systems 150*b*, 150*c*, and 150*d*. Thus, in the steady state, when there are no component failures, the loading on each of the circuits 1-4 is 1.5 for the loads (e.g., computer systems 150*a-f*).

In rows 1-4 of the column 204 of table 200, examples of loading on the circuits 1-4 are shown for two load sharing techniques. One technique is a conventional technique where the load demand is shared approximately equally by redundant components and upon failure of a component, 100% of the load is met by the functioning component. The second load sharing technique is a load balancing scheme implemented by the load manager 160 according to an embodiment of the invention. With regard to the conventional load sharing technique, if circuit 1 fails, the load demand on the circuit 1 is zero. However, because the circuit 1 was responsible for 50% of the load demand of the computer systems 150a-c, the redundant circuit for the computer systems 150a-c now must support 100% of the load demand of the computer systems 150a-c. This is shown in rows 2 and 4. The load demand on the circuit 2 due to the failure of circuit 1 is now 1 or 100% of the load demand of the computer system 150a, resulting in a total load demand on the circuit 2 of 2 equivalent load units. Likewise, the total load demand on the circuit 4 is now 2.5, because the circuit 4 must now meet 100% of the load demand of the computer systems 150b-c. Comparing the conventional load sharing technique to the load balancing embodiment implemented by the load manager 160, the load manager 160 controls the load demand on the functioning circuits 2-4 to be substantially equal, such that the load demand of the computer systems 150a-f is shared by the circuits 2-4. For example, as shown in rows 2 and 4 of the table 200, the load demand on the circuit 3 includes 100% of the load demand of the computer system 150d, resulting in equal sharing of the load demand of the computer systems 150a-f. In other embodiments, the load manager 160 may divide the load demand based on other load balancing schemes, instead of providing equal sharing of the load demand. For example, if one circuit has a greater capacity, then that circuit may be directed to support a greater portion of the load demand.

Rows 5-8 of the table 200 show the load demands on the circuits 1-4 in column 203 if circuit 2 also fails after circuit 1 fails. As shown in rows 5 and 6, the load demands on circuits 1 and 2 are zero, because circuit 2 also failed. As a result, for the conventional load sharing technique the load demand on circuit 3 is 2.5 and the load demand on circuit 4 is 2.5. Assume that circuit 2 has a maximum load value rating that is approximately equal to 2.3 equivalent loads. In this scenario, the failure of circuits 1 and 2 using the conventional load sharing technique results in circuit 3 being overloaded, thereby bringing all but computer systems 150b-d off line. For the load balancing embodiment, the load manager 160 shifts the load demand of computer system 150d from circuit 3 to circuit 4, thereby maintaining the load demand on circuit 3 below 2.3. As shown in the example provided in the table 200, load balancing according to an embodiment of the invention reduces the maximum capacity that the components of the power system 100 must support. Consequently, the power system 100 may be provisioned with less over capacity, yielding a cost savings. Secondly, load balancing according to an embodiment of the invention may take into consideration the maximum capacities (i.e., maximum load values) of power system components to minimize the possibility of overloading power system components.

Table 250 shown in FIG. 2B illustrates another example of load balancing whereby a UPS fails instead of a PDU circuit. FIG. 2B is described with respect to the power system 100 shown in FIG. 1. The UPSs 130a-d supply power to the loads, e.g., PDUs 140a-f, to meet the load demand of the computer systems 150a-l. As illustrated in row 1, columns 252-253 of the table 250 and as illustrated by the connections of the UPSs 130a-d to the PDUs 140a-f shown in FIG. 1, the UPS 130a supports ½ of the load demand of each of the PDUs 140a-c. Thus, the load demand on the UPS 130a is shown as 1.5 (½+½+½). The UPS 130b supports ½ of the load demand of each of the PDUs 140a-b and 140d. The UPS 130c supports ½ of the load demand of each of the PDUs 140c and 140e-f. The UPS 130d supports ½ of the load demand of each of the PDUs 140d-f. Thus, in the steady state, when there are no component failures, the load demand on each of the UPSs 130a-d is 1.5.

In rows 1-4, columns 255-258 of the table 250, examples of load demands on the UPSs 130a-d are shown for two load sharing techniques. One technique is a conventional technique where the load demand is shared equally by redundant components and upon failure of a component, 100% of the load demand is met by the functioning component. The second load sharing technique is a load balancing scheme implemented by the load manager 160 according to an embodiment of the invention. With regard to the conventional load sharing technique, if the UPS 130a fails the load demand on the UPS 130a is zero. However, because the UPS 130a was responsible for 50% of the load demand of the PDUs 140a-c, the redundant UPSs for the PDUs 140a-c now must support 100% of the load demand of the PDUs 140a-c. This is shown in rows 2 and 3, column 255 of the table 250. The load demand on the UPS 130b after the failure of the UPS 130a is 2.5 resulting from the increased load demand, i.e., 100% of the load demand, from each of the PDUs 140a and 140d. The load demand on the UPS 130c after the failure of the UPS 130a is 2 resulting from the increased load demand.

Comparing the conventional load sharing technique to the load balancing embodiment implemented by the load manager 160, the load manager 160 controls components of the power system 100 such that the functioning UPSs 140b-d substantially equally share the load demand of the PDUs 140a-f. In one embodiment, the current drawn from a UPS by a PDU may be controlled by the PDU instead of the UPS. Thus, the load manager 160 may direct the PDUs 140a-f to vary the amount of current drawn from the functioning UPSs 130b-d for load balancing.

As shown in rows 2-4, columns 257-258 of the table 250, the load manager 160 directs, for example, the PDUs 140a-b to draw current from the UPS 130b for supporting 100% of the load demand and directs the PDU 140d not to draw any current from the UPS 130b. Instead, the load manager 160 directs the PDU 140d to only draw current from the UPS 130d, such as shown in row 4, column 258 of the table 250. This results in equal sharing of the load demand of the computer systems 150a-l by the functioning UPSs 130b-d, such as shown in column 257.

As described above, the load manager 160 may direct power system components at one level in the power system to increase or reduce current draw from power system components one level higher to balance load demands on the power system components in the higher level. For example, the load manager 160 may direct the power systems of the computers 150a-f to increase or reduce power draw on the circuits 1-4 to control load demands on the circuits 1-4. Similarly, the load manager 160 may direct the PDUs 140a-d to increase or reduce power draw on the UPSs 130a-d to control load demands on the UPSs 130a-d. It will be apparent to one of ordinary skill in the art that other techniques may be used for balancing load demands. For example, the load manager 160 may direct the PDUs 140a-d to control their power output, such as the power output of the circuits 1-4, to balance the load demands on the PDUS 140a-d.

Figure 3:
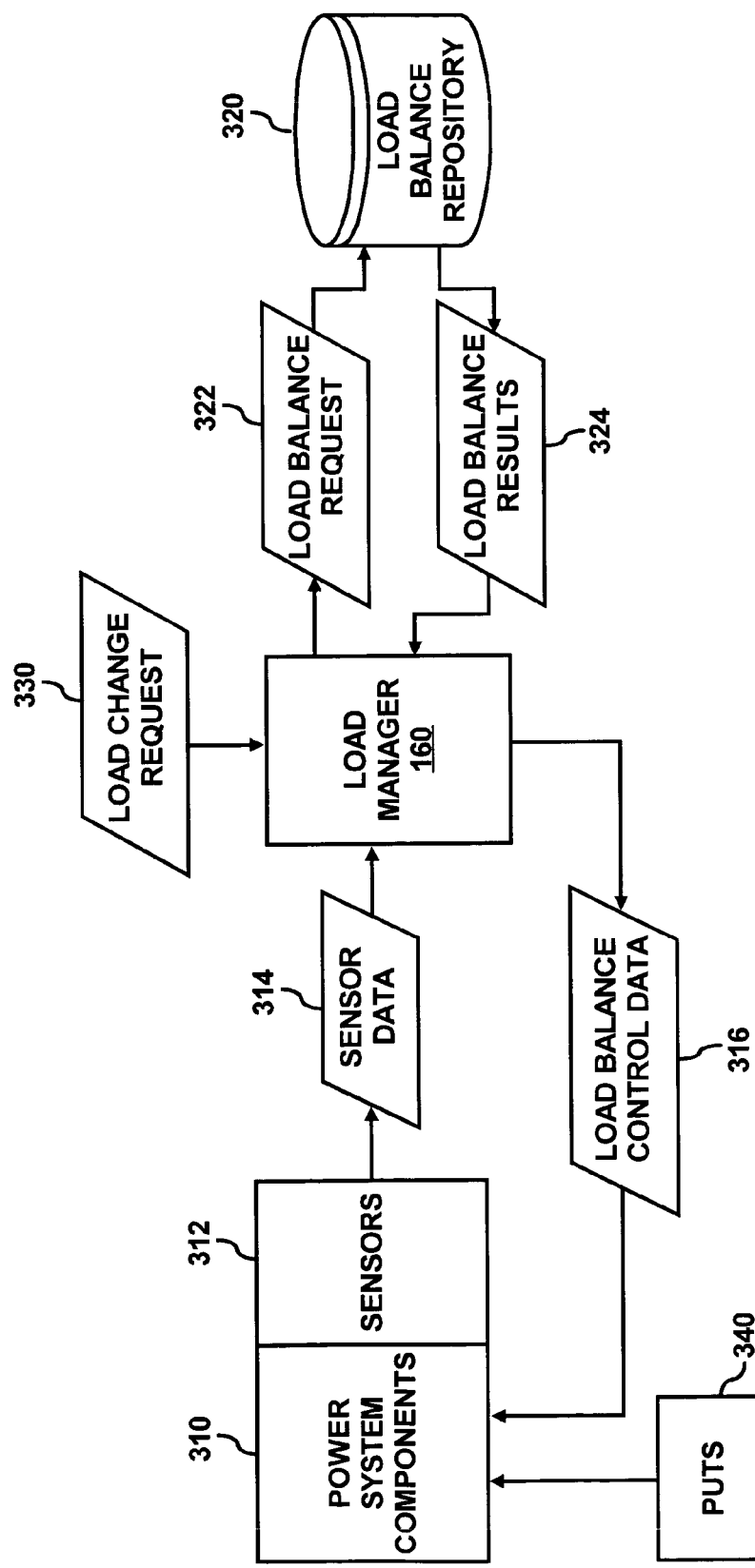
FIG. 3 illustrates a data flow diagram for the power system shown in FIG. 1, according to an embodiment of the invention.

FIG. 3 illustrates a data flow diagram for the power system 100 of FIG. 1, according to an embodiment of the invention. FIG. 3 includes power system components 310 connected to the load manager 160. The power system components 310 may include the components of the power system 100 shown in FIG. 1, such as the transfer switch 120, the UPSs 130a-d, the PDUs 140a-f, the circuits 1-4, the computer systems (or the computer system power supplies) 150a-l, etc. The power system components 310 may include sensors 312 for measuring the load demand on the power system components 310, i.e., the sensor data 314. The sensors 312 may include conventional power measurement circuits, such as current and/or voltage measuring circuits.

The sensor data 314 is transmitted to the load manager 160 from the sensors 312. The load manager 160 determines from the sensor data 314 whether the load demands on one or more of the power system components 310 need to be balanced. If the load demands need to be balanced, the load manager 160 sends load balancing control data 316 to the power system components 310. The load balancing control data 316 may include data associated with the amount of loading to be applied to power system components to balance the load demand for those components. In one embodiment, the load balancing control data 316 is transmitted to the load (e.g., power system components at a lower level) instructing the load to reduce or increase current draw on the power system components (e.g., power system components at one or more levels above the load) to balance the load demand on those power system components. The load balancing control data 316 may include an amount of power to be consumed by each of the loads. For example, the load manager 160 may direct the power supplies of one or more of the computer systems 150a-l to vary their load demand by drawing more or less current from the corresponding circuits connected to the PDUs 140a-f to balance the load demand on those circuits. Similarly, the load manager 160 may direct one or more of the PDUs 140a-f to vary their load demands on the UPSs 130a-d to balance the load demand on the UPSs 130a-d. In another embodiment, the load balancing control data 316 may be transmitted to the power system components having their load demands balanced, and may include the amount of power to be supplied to each load. For example, if the load demand of one of more of the PDUs 140a-f is to be varied, the load manager 160 may instruct, for example, the PDU 140b to decrease its power output of circuit 4 to a particular load and may instruct the PDU 140d to increase its power output of a circuit connected thereto for balancing the load demand on the PDUs 140a-f.

According to an embodiment, the load manager 160 may detect failure of one of the power system components 310 using the sensor data 314 and perform load balancing, such as shown in the examples provided in the tables 200 and 250 of the FIGS. 2A-B. Failure detection, for example, may be determined by sensing no loading of one of the power system components 310 or by sensing overloading of one of the power system components 310.

The load manager 160 is connected to a load balancing repository 320 storing load balancing data. In one embodiment, the load manager 160 builds a model of the power system 100 and populates the model with a state of the power system 100 that exists if a failure is detected, assuming that load balancing is not performed. Then, the load manager 160 solves the model to determine the optimal load demands for the power system components 310 in view of the failure. The solution is saved in the load balance repository 320. This process is repeated, modeling different failures each time, and storing the solutions (e.g., balanced load demands on the power system components 310) in the load balance repository 320. When an actual failure is detected by the load manager 160, based for example on the received sensor data 314, the load manager 160 queries the load balance repository 320, such as shown as load balance request 322, with the state of the power system 322, including the detected failure, to retrieve the load balancing solution, such as shown as load balance results 324, to be implemented in the power system 100.

According to other embodiments, when the power system 100 is in a steady state the load manager 160 may still invoke load balancing. The power system 100 may be in a steady state if no failures of power system components are detected. Also, even if a power system component has failed, but load balancing was performed and/or the failed component was replaced, the power system 100 may reach a steady state with no abnormal fluctuation of load demands. In one embodiment when the power system 100 is in a steady state, the load manager 160 may receive a load change request 330 to balance the load demand on one or more of the power system components 310. Such balancing may be used to allow maintenance on one of the power system components 310 or to free up capacity in a given set of power system components 310 to allow for the deployment of a new computer system. The load change request 330, for example, may be initiated by a system administrator (not shown).

In another embodiment when the power system 100 is in the steady state, the load manager 160 may monitor the load demands on the power system components 310 to determine whether load demands meet predetermined conditions. For example, the load manager 160 may be requested to maintain power system components 310 in a given level of the power system 100 to support substantially the same fraction of the total load demand of the power system components 310 in the level. For example, each of the UPSs 130a-d source ¼ of the load demand on the UPSs 130a-d.

Another example of the predetermined conditions may include maintaining substantially the same spare capacity for power system components 310 in a given level. For example, the UPSs 130a-b may have twice the capacity of the UPSs 130c-d, and the load demands on the UPSs 130a-b may be adjusted to be twice the load demands of the UPSs 130c-d so as to provide equal tolerance for a failure. In yet another example, the predetermined conditions may be related to providing more tolerance for critical loads to decrease the possibility of power loss to the critical loads. In yet another example, the predetermined conditions may be related to maintaining the load demand on the power system components 310 below predetermined thresholds. The thresholds may be associated with a maximum capacity of the power system components, such as maximum power output, maximum load current, etc. The thresholds may include tolerances, such as being below a rated maximum capacity. Also, the thresholds may be related to a rate of increase of load demand. In addition to the load balancing solutions generated from modeling the power system 100 in different states, the load balance repository 320 may store the thresholds and other data needed to perform load balancing, which may be used in the steady state. For example, the load balance repository 320 stores data identifying the connection of a power system component 310 to other power system components 310. Thus, the load manager 160 may determine which loads need to be balanced based on which power system components 310 are able to service a load. Also, the load balance repository may store the sensor data 314 periodically received by the load manager 160.

The power system 100 may optionally include point-of-use transfer switches (PUTS) 340 for executing a quick transfer of load demand among the power system components 310. Other fast load transfer devices performing the same function as the PUTS 340 may also be used. If load demands cannot be balanced by the load manager 160 within a predetermined period of time, such as due to software and data processing limitations, then PUTS 340 may be used to execute a fast transfer of loads (e.g., within ¼ cycle or 4-6 ms) to predetermined sources to prevent overloading of one of the power system components 310. Then, the load manager 160 may rebalance the load demands to provide optimal loading of the power system components 310.

Figure 4:
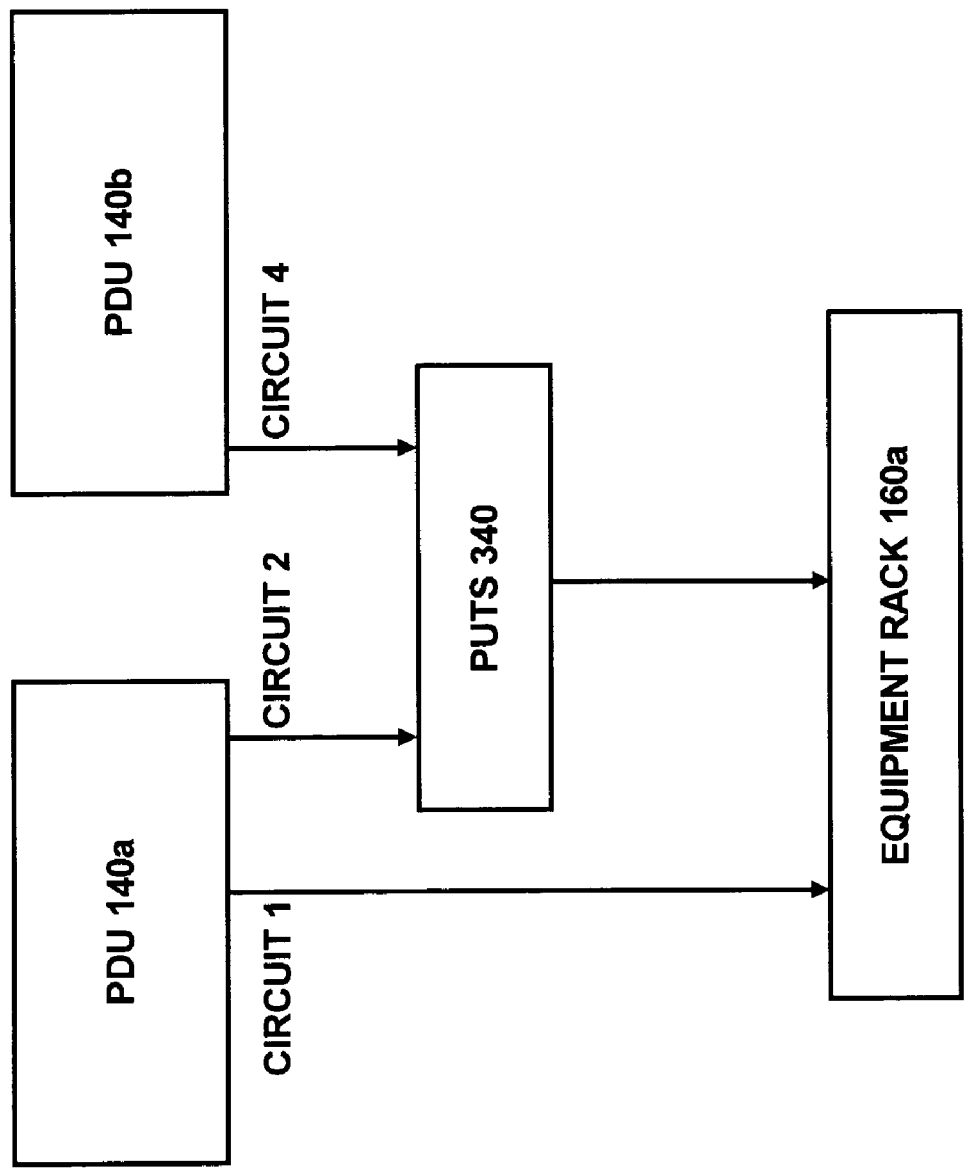
FIG. 4 illustrates a block diagram of a portion of a power system using a PUTS, according to an embodiment of the invention.

FIG. 4 is a block diagram of a portion of the power system 100 including a PUTS 340 connected between the PDU 140 and the equipment rack 160a housing the computer systems 150a-c. In the steady state, circuits 1 and 2 supply power to the rack 160a. If circuit 2 fails, then the PUTS 340 switches the source from circuit 2 to circuit 4 connected to the PDU 140b and circuits 1 and 4 supply power to the rack 160a. Then, the load manager 160 balances the load demand on the functioning circuits connected to the PDUs 140a-f based on a load balancing scheme, which may include distributing some of the load demand on circuit 4 to other circuits. By using the PUTS 340, circuit 1 may not need to meet the load demand of the computer systems 150a-c housed in the rack 160a on its own. Thus, a lower capacity circuit may be used, reducing costs. In addition, the PUTS 340 allows fast switching of sources to substantially prevent overloading circuit 1. It will be apparent to one of ordinary skill in the art that multiple PUTS may be used in the power system 100, including multiple PUTS in FIG. 4. Furthermore, a PUTS may be incorporated in each rack 160a-d, instead of using multiple external PUTS connected to the PDU circuits, to minimize costs.

Figure 5:
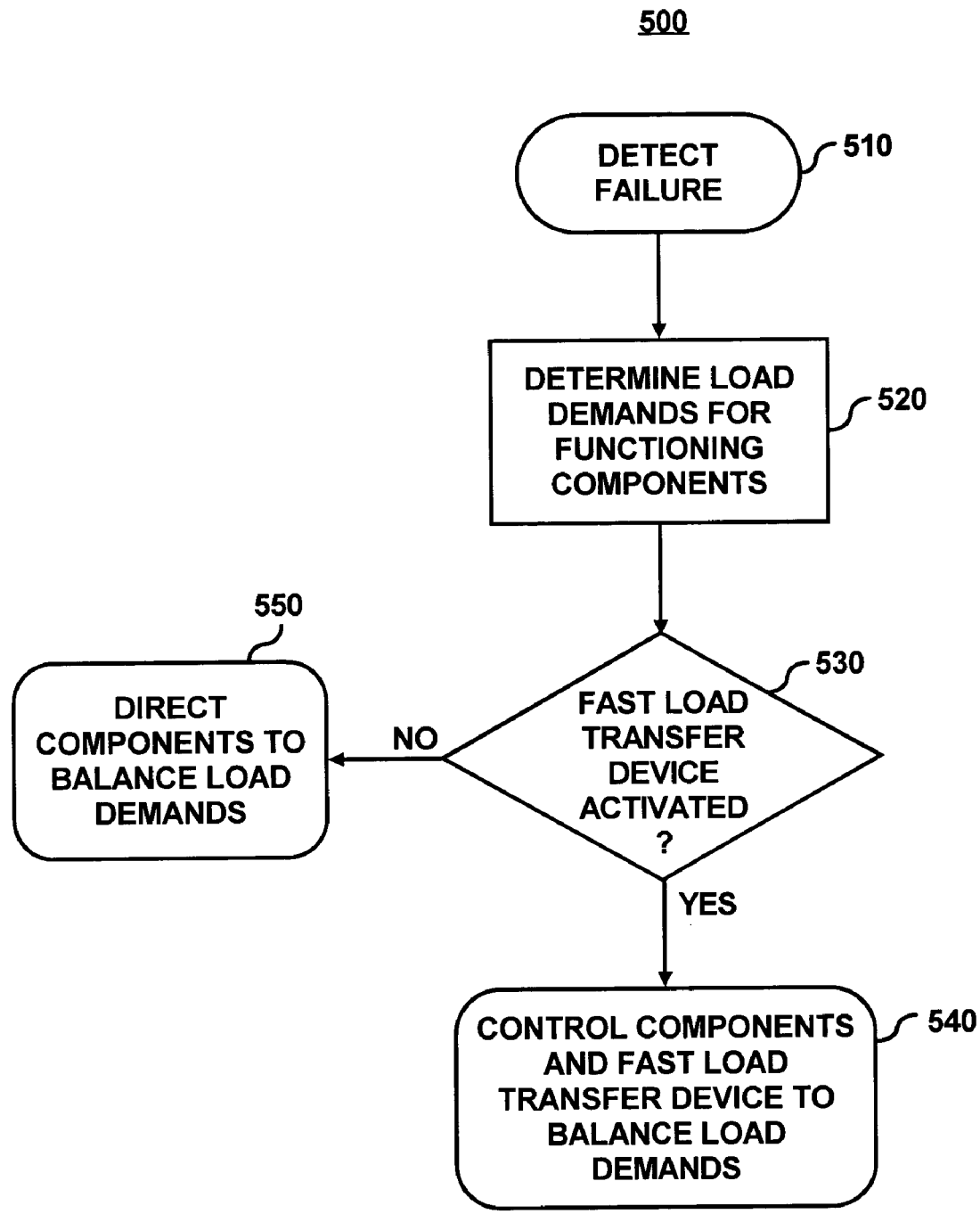
FIG. 5 illustrates a flow chart of a method for managing load demands when a power system component fails, according to an embodiment of the invention.

FIG. 5 illustrates a method 500 for balancing load demand in a power system in response to detecting a failure of a power system component, according to an embodiment of the invention. The method 500 is described with respect to the power system 100 shown in FIGS. 1 and 2 by way of example and not limitation. Furthermore, the steps of the method 500 may be performed by software, hardware or a combination thereof.

At step 510, the load manager 160 detects a failure of a power system component of the power system 100. Failure detection may be based on the sensor data 314 received from the power system components 310 of the power system 100 shown in FIG. 2.

At step 520, the load manager 160 determines an optimal loading of components in the power system in view of the failed power system component. In one embodiment, the load manager 160 determines optimal load demands for the functioning components in the same level of the power system 100 as the failed component. For example, referring to FIG. 1, the PDU level includes the PDUs 140a-f. If circuit 1 of PDU 140a fails, then the load manager 160 determines the optimal load demand to be placed on the functioning PDUs 140b-f or circuits connected thereto. The power system components in one level may provide a level of redundancy for their respective loads. Thus, failure of one component in the level affects the load demand on at least one other component in the level, depending on the level of redundancy. As described above, in order to balance load demands at a target level of the system or grid, the load manager 160 may direct components at one level below the target level to increase or reduce current draw on the functioning components at the target level. Also, the load manager 160 may direct the functioning components at the target level to increase or reduce their power outputs to balance load demands at the target level instead of instructing the components at one level below the target level to increase or reduce current draw.

In one embodiment, the load manager 160 may determine optimal loading of the power system components based on previous modeling of failures in the power system 100. Different states of the power system 100 are modeled or simulated by the load manager 160. Modeling of the different states includes determining resulting load demands on the power system components in response to one or more failed components, and determining optimal load demands that may be applied to the functioning components based on a load balancing scheme. Different states of the power system 100, including failures of different power system components, are modeled to determine optimal load demands for the different states. The optimal load demands may then be used as a look-up table. Thus, when an actual failure is detected, optimal load demands are retrieved from the look-up table that are generated from a modeled state similar to a current state of the power system including the actual detected failure of a power system component. In other embodiments, the load manager 160 may balance load demands by calculating load demands for the power system components based on a load balancing scheme being implemented and the measured current load demands.

The load manager 160 may use different load balancing schemes to determine optimal load demands for the power system components at step 520. Load balancing schemes may include substantially equally dividing a total load demand on functioning power system components in a level where a failed power system component is detected, such as described with respect to Tables 200 and 250 in FIGS. 2A-B. The load balancing scheme may take into consideration maximum loading values for the power system components. A maximum loading value, for example, may include a maximum rated power output or power demand that the power system component is designed to support. If the maximum loading value is exceeded, the power system component may fail. Other load balancing schemes may include balancing load demands such that power system components have substantially equal spare capacity, or greater spare capacity may be provided for power system components servicing critical loads. It will be apparent to one of ordinary skill in the art that these and other load balancing schemes may be implemented by the load manager 160.

Fast load transfer devices, such as the PUTS 340 shown in FIGS. 3 and 4, may optionally be used in the power system 100 to transfer load demand in minimal times to prevent overloading of a power system component before load balancing can be performed. If fast load transfer devices are activated due to overloading caused by the failed power system component, then, at steps 530 and 540, the load manager 160 controls the load demands on the power system components to be substantially equal to the load demands determined at step 520 based on the load balancing scheme. In one embodiment, the load manager 160 directs the power system components, such as the functioning power system components in the same level as the failed power system component, and the fast load transfer devices to balance the load demands on the power system components as determined at step 520. If fast load transfer devices are not used in the power system 100 or are not affected by the failed power system component, then the load manager 160, at steps 530 and 550, directs the power system components, such as the functioning power system components in the same level as the failed power system component, to balance the load demands on the components as determined at step 520. In one embodiment, the load manager 160 may control a load demand on a power system component by directing the power system to increase or reduce its power output to meet a load demand determined at step 520. In another embodiment, the load manager may direct a load on the power system component to increase or reduce its current draw on the power system component to vary the load demand on the power system component.

Figure 6:
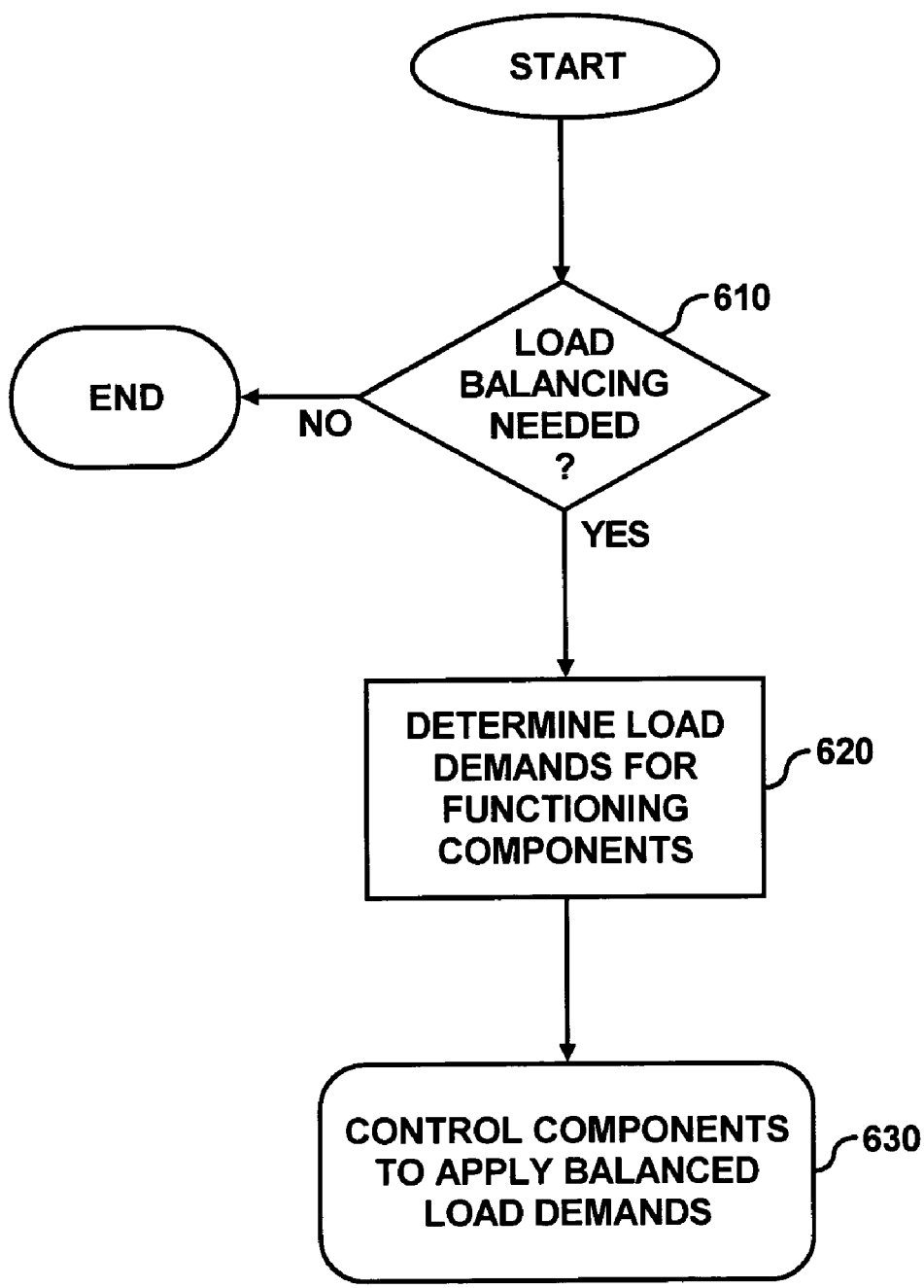
FIG. 6 illustrates a flow chart of a method for managing load demands when a power system is in a steady state, according to an embodiment of the invention.

FIG. 6 illustrates a method 600 for balancing load demand in a power system in a steady state. The method 600 is described with respect to the power system 100 shown in FIGS. 1 and 2 by way of example and not limitation. Furthermore, the steps of the method 600 may be performed by software, hardware or a combination thereof.

At step 610, the load manager 160 determines whether load balancing is needed. Load balancing in the steady state may be performed for reasons other than detection of a failed power system component. For example, load balancing may be performed in response to a request received by the load manager 160. The load manager 160 may receive a request 330 to balance load demands on one or more of the power system components 310 shown in FIG. 3 to allow maintenance on one of the power system components 310 or to free up capacity in a given set of power system components 310 to allow for the deployment of a new computer system.

Also, the load manager 160 may balance load demands in the power system 100 to meet predetermined conditions. For example, the load manager 160 may periodically monitor the load demands on the power system components 310. If the load demands fall out of balance, the load manager 160 balances the load demands, which may include varying one or more of the load demands based on a load balancing scheme being implemented by the load manager 160.

At step 620, if load balancing is needed, the load manager 160 determines load demands for power system components in the power system 100 based on the load balancing scheme being implemented at step 610. Different load balancing schemes may be implemented by the load manager 160. Load balancing schemes may include substantially equally dividing a total load demand on functioning power system components in a level where a failed power system component is detected, such as described with respect to Tables 200 and 250 in FIGS. 2A-B. The load balancing scheme may take into consideration maximum loading values for the power system components. A maximum loading value, for example, may include a maximum rated power output or power demand that the power system component is designed to support. If the maximum loading value is exceeded, the power system component may fail. Other load balancing schemes may include balancing load demands such that power system components have substantially equal spare capacity, or greater spare capacity may be provided for power system components servicing critical loads. It will be apparent to one of ordinary skill in the art that these and other load balancing schemes may be implemented by the load manager 160.

Also, in one embodiment, the load manager 160 may model different states of the power system 100 to determine optimal load demands for different states of the power system 100 based on the load balancing scheme being implemented. The optimal load demands may be used to populate the data repository 320 shown in FIG. 3, which may include a look-up table or database. The load manager 160 determines the current state of the power system from the measured load demands, for example, from the sensor data 314 shown in FIG. 3 received from the sensors 312. Using the current state, the load manager 160 queries the look-up table for optimal load demands to be applied to the power system components 310. In other embodiments, the optimal load demands may be periodically calculated from the sensor data 314.

At step 630, the load manager 160 controls the load demands on the power system components 310 to apply the balanced load demands determined at step 620. In one embodiment, the load manager 160 directs the power system components to vary their load demands such that the load demands are substantially equal to the load demands determined at step 620. In another embodiment, the load manager 160 may direct a load to increase or decrease its current draw from a source, i.e., a power system component that needs to change its load demand to a load demand determined at step 620, such that the load demand on the source is substantially equal to the load demand determined at step 620. For example, referring to FIG. 1, the load demand on the UPS 130a may be varied by directing the PDU 140a to vary the current draw on the UPS 130a, i.e., to vary the amount of power required by the UPS 130a from the PDU 140a.

One or more of the steps of the methods 500 and 600 may be repeated substantially continuously, periodically or demand driven to perform load balancing in the power system 100. These and other variations to the methods 500 and 600 will be apparent to one of ordinary skill in the art.

Figure 7:
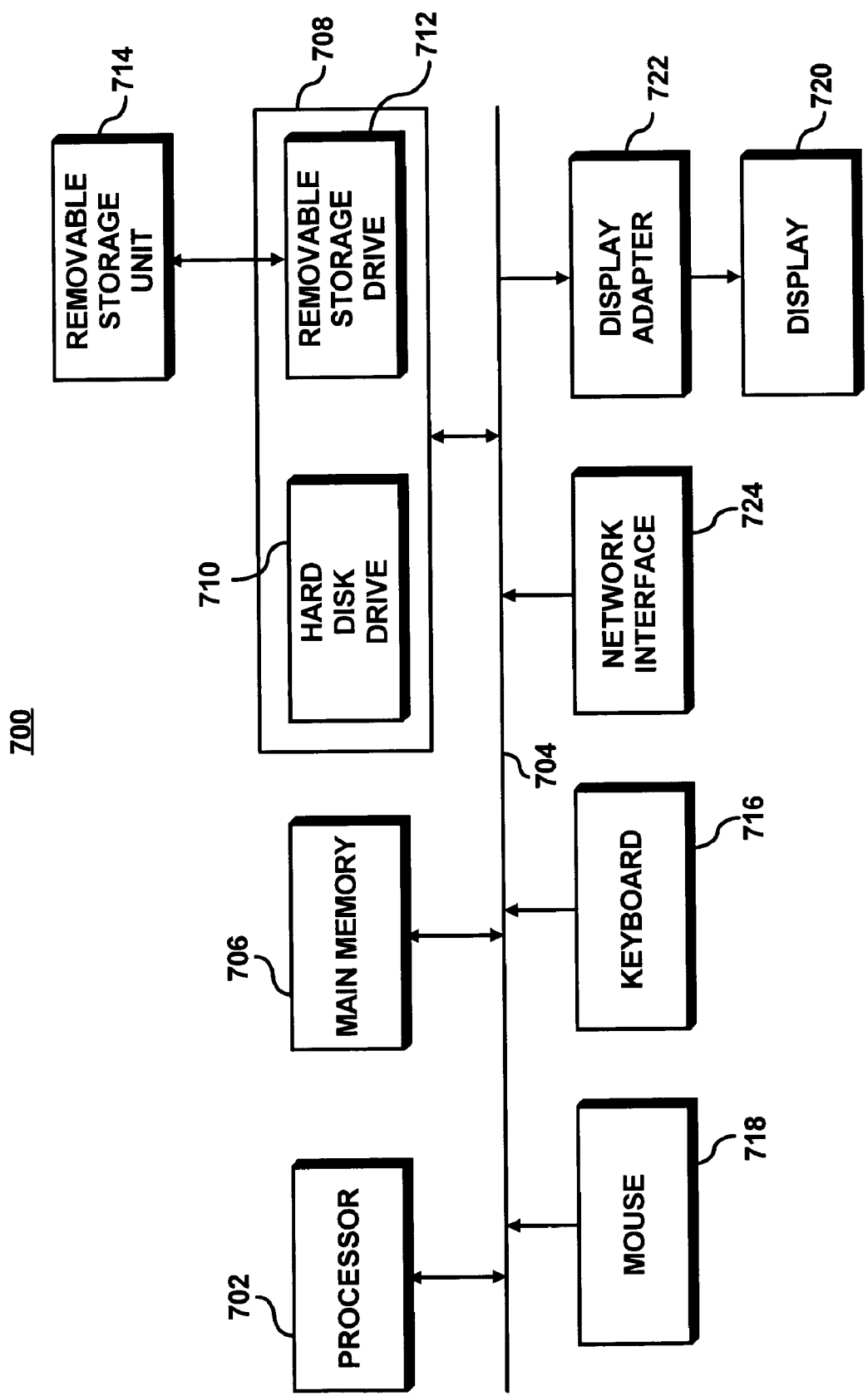
FIG. 7 illustrates a load management platform, according to an embodiment of the invention.
Figure 8:
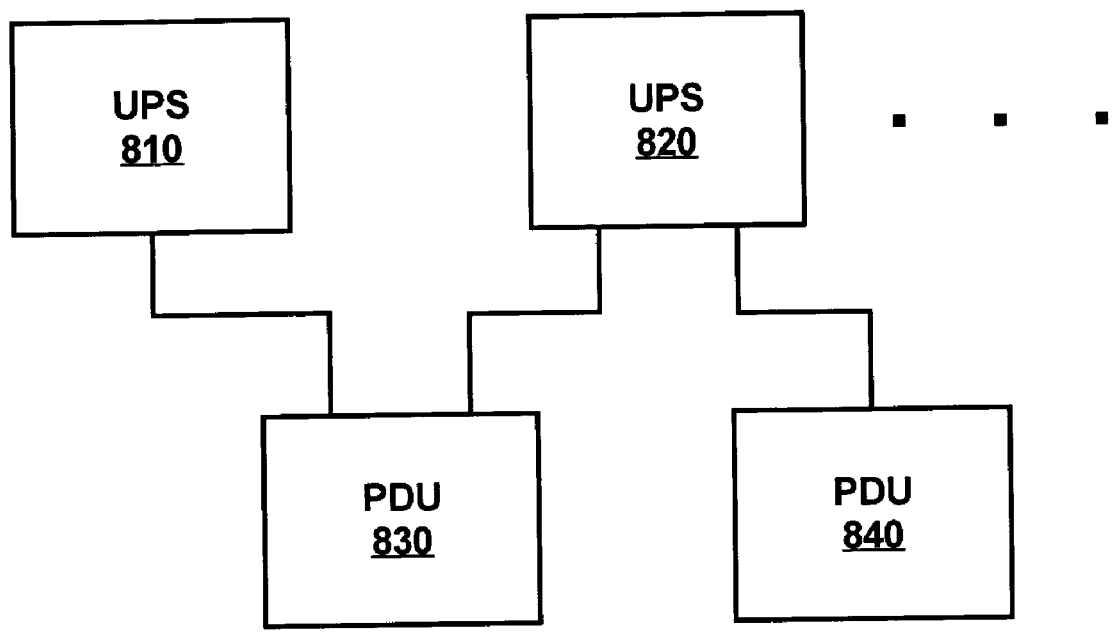
FIG. 8 illustrates conventional load sharing.

FIG. 7 illustrates an exemplary platform 700 for the load manager 160. In one embodiment, the steps of the methods 500 and 600 performed by the load manager 160 may be performed by software or software in combination with hardware. The software may be executed on the platform 700. The platform 700, for example, includes one or more processors, such as processor 702. Commands and data from the processor 702 are communicated over a communication bus 704. The platform 700 also includes a main memory 706, such as a random access memory (RAM), where the program code for the load manager 160 may be executed during runtime, and a secondary memory 708. The secondary memory 708 includes, for example, one or more hard disk drives 710 and/or a removable storage drive 712, representing a floppy diskette drive, a magnetic tape drive, a compact disk drive, etc., where a copy of the program code for the load manager 160 may be stored. The removable storage drive 710 reads from and/or writes to a removable storage unit 714 in a well-known manner. User input and output devices may include a keyboard 716, a mouse 718, and a display 720. The display adaptor 722 interfaces with the communication bus 704 and the display 720 and receives display data from the processor 702 and converts the display data into display commands for the display 720. It will be apparent to one of ordinary skill in the arts that other known electrical components may be added or substituted in the platform 700. Also, one or more of the components in FIG. 7 may be optional (e.g., user input devices, secondary memory, etc.). A network interface 724 may also be included for communicating with other computer systems and/or the power system components of the power system 100.

What has been described and illustrated herein are embodiments of the invention. The terms, descriptions and figures used herein are set forth by way of illustration only and are not meant as limitations. Those skilled in the art will recognize that many variations are possible within the spirit and scope of the invention.

What is claimed is:

1. A method of managing load in a power system comprising:

determining whether a load demand on at least one power system component of a plurality of power system components needs to be varied, wherein the plurality of power system components includes a first set of power system components, wherein load demand includes a percentage of electric current drawn by the at least one power system component;

calculating a new load demand to be placed on the at least one power system component based on a load demand on, and a maximum loading value of, at least one other functioning power system component of the plurality of power system components in response to determining the load demand on the at least one power system component needs to be varied, wherein the at least one other functioning power system component has a maximum loading value which is different from the maximum loading value of the at least one power system component;

controlling the load demand on the at least one power system component to be equal to the calculated new load demand by changing the load demand on the at least one power system component such that the maximum loading values of the at least one power system component and the at least one other functioning power system component are not exceeded;

determining whether load demands on a second set of power system components need to be varied, wherein the second set of power system components receive power from the first set of power system components;

calculating new load demands to be placed on the second set of power system components in response to determining the load demands on the second set of power system component need to be varied; and controlling the load demands on the second set of power system components to be equal to the calculated new loads for the second set of power system components.

2. The method of claim 1, wherein determining whether load demand on the at least one other power system component needs to be varied further comprises determining whether a failure of one of the plurality of power system components occurred.

3. The method of claim 2, wherein determining a new load demand to be placed on the at one power system component further comprises:
determining a total load demand on the plurality of power system components, wherein the plurality of power system components are similar to the failed power system component and are functioning; and
dividing the total load demand equally among die plurality of power system components.

4. The method of claim 3, wherein determining anew load demand to be placed on the at least one power system component further comprises determining a new load demand that is less than a maximum loading value of the at least one power system component.

5. The method of claim 2, wherein calculating a new load demand to be placed on the at least one power system component further comprises:
storing optimal load demands for the plurality of power system components; and
determining new load demands for the plurality of power system components based on the stored load demands.

6. The method of claim 1, wherein determining whether a load demand on at least one power system component of a plurality of power system components needs to be varied further comprises determining whether a request to change the load demand of the at least one power system component is received.

7. The method of claim 6, wherein the request is a power system component maintenance related request.

8. The method of claim 1, wherein determining whether a load demand on at least one power system component of a plurality of power system components needs to be varied further comprises:
determining whether load demands on die plurality of power system components are balanced based on a balancing scheme; and
calculating a new loud demand comprises calculating new load demands for the plurality of power system components based on the balancing scheme in response to the load demands on the plurality of power system components being unbalanced.

9. The method of claim 8, wherein the balancing scheme is associated with at least one of dividing a total load demand on the one or more power system components substantially equally, providing substantially equal spare capacity for the one or more power system components, preventing any of the one or more power system components from exceeding a maximum loading value, and providing greater spare capacity for critical loads.

10. The method of claim 1, wherein controlling the load demand on the at least one power system component to be equal to the determined new load demand further comprises directing the at least one power system component to change its load demand to the new load demand.

11. The method of claim 1, wherein controlling die load demand on the at least one power system component to be equal to the determined new load demand further comprises:
directing a power system component drawing current from the at least one power system component to vary its current draw on the at least one power system component.

12. The method of claim 1, wherein the plurality of power system components comprise power system components substantially located in a data center and providing power to meet the load demand of a plurality of computer systems housed in the data center.

13. The method of claim 1, wherein the at least one power system component comprises power system components in a level in a power grid.

14. A system for balancing load demands on power system components comprising:
a first set of power system components in the power system; and
a load manager calculating load demands to be placed on the first set of components based on a load balancing scheme, wherein load demands include a percentage of electric current drawn by the first set of components; and controlling load demands on the first set of the power system components to be equal to the calculated load demands;
a second set of power system components receiving power from the first set of power system components, wherein the load manager sends control data to the first set of power components to control the load demands to be equal to the calculated load demands, and
the load manager calculates load demands to be placed on the second set of power system components based on the load balancing scheme and sends control data to the second set of power system components to control the load demands on the second set of power system components to be equal to the calculated load demands for the second set of power system components.

15. The system of claim 14, wherein the load manager is connected to a data repository storing optimal load demands far the first set of power system based on modeling the power system in different failure states, and the load manager determines the new load demands for the first set of power system components by identifying the new load demands from the stored optimal load demands that are associated with the current state of the power system.

16. The system of claim 14, wherein the load manager is operable to detect a failure of a power system component of the first set of power system components from the received data and to control the load demands on the first set of power system components based on the load balancing scheme in response to detecting the failure.

17. The system of claim 14, wherein the load manager is operable to implement the load balancing scheme in response to at least one of a received request to change the load demands on one or more of the first set of components and a determination that the load demands on the first set of power components do not meet predetermined conditions associated with the load balancing scheme.

18. The system of claim 14, wherein the load balancing scheme is associated with at least one of dividing a total load demand on the one or more power system components substantially equally, providing substantially equal spare capacity for the one or more power system components, preventing any of the one or more power system components from exceeding a maximum loading value, and providing greater spare capacity for critical lands.

19. The system of claim 14, further comprising a fast transfer load device connected to one power system component of the first set of power system components, the fast transfer load transfer device controlling load demand on the one power system component in response to detecting an over loading on the one power system component.

20. The system of claim 19, wherein the load manager implements the load balancing scheme after the first transfer load device controls the load demand on the one power system component.

21. The system of claim 14, wherein the power system further comprises a second set of power system components receiving power from the first set of power system components, and the load manager directs at least one power system component of the second set of power system components to vary the load demand on at least one power system component of the first set of power system components to control the load demands on the first set of power system components based on the load balancing scheme.

22. The system of claim 14, wherein the load manager controls the load demands on the first set of power system components based on the load balancing scheme by directing at least one power system component in the first set of power system components to vary load demand.

23. The system of claim 14, wherein the first set of components comprise power system components in a level in the power system.

24. The system of claim 14, wherein the first set of power system components comprise redundant components supplying power to the same load.

25. The system of claim 14, wherein the load manager is operable to calculate the load demands to be placed on the first set of components by determining a total load demand on the first set of components; and dividing to total load demand equally among the first set of components.

26. An apparatus for managing load demands in a power system comprising:
    means for determining whether load demands on a plurality of power system components in the power system aced to be varied, wherein the plurality of power system components includes a first set of power system components and load demand includes a percentage of electric current drawn by the at least one power system component;
    means for calculating new load demands to be placed on the plurality of power system components based on maximum loading values or the plurality of power system components and in response to determining the load demands need to be varied;
    means for controlling the load demands on the plurality of power system components to be equal to the calculated new load demands by shifting the load demands between the plurality of power system components such that the maximum loading values are not exceeded, and wherein at least two of the maximum loading values are different;
    means for sending control data to the first set of power components to control the load demands to be equal to the calculated load demands, and
    means for calculating load demands to be replaced an a second set of power system components receiving power from the first set of power system components; and
    means far sending control data to the second set of power system components to control to load demands on the second set of power system components to be equal to the calculated load demands for the second set of power system components.

27. The apparatus of claim 26, wherein the means for determining whether load demands on the plurality of power system components need to be varied further comprises means for determining whether load demands on the plurality of power system components need to be varied when a failure of one of the plurality of power system components is detected or when the power system is in a steady state.

28. The apparatus of claim 26 further comprising data repository means for storing optimal load demands for the plurality of power system components and the means for determining new load demands retrieves to new load demands from the stored optimal load demands.

29. The apparatus of claim 26, further comprising fast load transfer means connected to at least some of the plurality of power system components for varying the load demands on one or more of the power system components connected to to fast load transfer means in response to detecting an overloading of a power system component connected to the fast load transfer means.

* * * * *

UNITED STATES PATENT AND TRADEMARK OFFICE
CERTIFICATE OF CORRECTION

PATENT NO. : 7,236,896 B2
APPLICATION NO. : 10/673134
DATED : June 26, 2007
INVENTOR(S) : Keith Istvan Farkas et al.

It is certified that error appears in the above-identified patent and that said Letters Patent is hereby corrected as shown below:

In column 13, line 42, in Claim 3, after "the at" insert -- least --.

In column 13, line 48, in Claim 3, delete "die" and insert -- the --, therefor.

In column 13, line 50, in Claim 4, delete "anew" and insert -- a new --, therefor.

In column 14, line 2, in Claim 7, delete "maintenance related" and insert -- maintenance-related --, therefor.

In column 14, line 7, in Claim 8, delete "die" and insert -- the --, therefor.

In column 14, line 10, in Claim 8, delete "loud" and insert -- load --, therefor.

In column 14, line 28, in Claim 11, delete "die" and insert -- the --, therefor.

In column 15, line 1, in Claim 15, delete "far" and insert -- for --, therefor.

In column 15, line 27, in Claim 18, delete "lands" and insert -- loads --, therefor.

In column 15, line 35, in Claim 20, delete "first" and insert -- fast --, therefor.

In column 16, line 2, in Claim 25, delete "to" and insert -- the --, therefor.

In column 16, line 16, in Claim 26, delete "or" and insert -- of --, therefor.

In column 16, line 29, in Claim 26, delete "replaced an" and insert -- placed on --, therefor.

In column 16, line 33, in Claim 26, delete "far" and insert -- for --, therefor.

In column 16, line 34, in Claim 26, after "control" delete "to" and insert -- the --, therefor.

In column 16, line 49, in Claim 28, delete "to" and insert -- the --, therefor.

UNITED STATES PATENT AND TRADEMARK OFFICE
CERTIFICATE OF CORRECTION

PATENT NO. : 7,236,896 B2
APPLICATION NO. : 10/673134
DATED : June 26, 2007
INVENTOR(S) : Keith Istvan Farkas et al.

It is certified that error appears in the above-identified patent and that said Letters Patent is hereby corrected as shown below:

In column 16, line 55, in Claim 29, after "connected to" delete "to" and insert -- the --, therefor.

Signed and Sealed this

Thirtieth Day of June, 2009

JOHN DOLL
*Acting Director of the United States Patent and Trademark Office*